(12) United States Patent
Andrick et al.

(10) Patent No.: US 7,922,179 B2
(45) Date of Patent: Apr. 12, 2011

(54) CAST-IN-PLACE GASKET FOR PIPE JOINTS

(75) Inventors: William C. Andrick, North Canton, OH (US); Johann Schlusselbauer, Gaspoltshofen (AT)

(73) Assignee: Vertex, Inc., Mogadore, OH (US)

( * ) Notice: Subject to any disclaimer, the term of this patent is extended or adjusted under 35 U.S.C. 154(b) by 425 days.

(21) Appl. No.: 11/999,108

(22) Filed: Dec. 4, 2007

(65) Prior Publication Data

US 2008/0088096 A1    Apr. 17, 2008

Related U.S. Application Data

(63) Continuation-in-part of application No. 11/358,166, filed on Feb. 21, 2006, now abandoned.

(51) Int. Cl.
*F16L 21/02* (2006.01)
(52) U.S. Cl. ........................................ 277/615; 277/617
(58) Field of Classification Search .................. 277/607, 277/615, 617; 285/64, 230; 296/93
See application file for complete search history.

(56) References Cited

U.S. PATENT DOCUMENTS

| | | | | |
|---|---|---|---|---|
| 1,817,870 | A * | 8/1931 | Bille | 277/615 |
| 2,032,492 | A * | 3/1936 | Nathan | 277/615 |
| 2,259,940 | A | 10/1941 | Nathan | |
| 2,882,073 | A * | 4/1959 | James | 277/615 |
| 2,896,974 | A * | 7/1959 | Bush | 277/607 |
| 2,924,472 | A * | 2/1960 | Bush | 277/605 |
| 3,048,415 | A * | 8/1962 | Shook | 277/615 |
| 3,081,102 | A * | 3/1963 | Murray et al. | 277/607 |

(Continued)

FOREIGN PATENT DOCUMENTS

GB    2078327 A    *    1/1982

(Continued)

OTHER PUBLICATIONS

Embed. (n. d.). Dictionary.com Unabridged. Retrieved Aug. 25, 2010, from Dictionary.com website: http://dictionary.reference.com/browse/embed.*

*Primary Examiner* — Shane Bomar
*Assistant Examiner* — Gilbert Y Lee
(74) *Attorney, Agent, or Firm* — Fay Sharpe LLP (57) ABSTRACT

A cast-in-place gasket is provided for an associated pipe joint. The gasket is mounted to a first associated pipe and adapted to provide a seal between the first associated pipe and a second associated pipe. The gasket includes a gasket body formed into an annulus from a resilient material. A first sealing head and a second sealing head protrude from the body in an axially rearward and radially inward direction. The first sealing head is axially spaced from the second sealing head. Each of the first sealing head and the second sealing head include a sealing surface. A first mounting foot and a second mounting foot protrude from the body in a radially outward direction. The first mounting foot is axially spaced from the second mounting foot. An open annular cavity is defined in the body between the first sealing head and the second sealing head. A first lip protrudes from the body proximal to a base of the first sealing head and extends in an axially forward and radially inward direction. A second lip protrudes from the body proximal to the sealing surface of the second sealing head and extends in an axially rearward and radially inward direction. The first lip and the second lip cooperate to inhibit the flow of an associated casting material from contacting the sealing surfaces of the gasket during casting of the associated first pipe.

20 Claims, 9 Drawing Sheets

U.S. PATENT DOCUMENTS

| | | |
|---|---|---|
| 3,520,541 A | 7/1970 | Rohani Amir |
| 3,647,229 A | 3/1972 | Grimes |
| 3,787,061 A | 1/1974 | Yoakum |
| 3,831,950 A | 8/1974 | Bentley et al. |
| 4,103,901 A | 8/1978 | Ditcher |
| 4,159,829 A | 7/1979 | Ditcher |
| 4,174,125 A | 11/1979 | Wyss |
| 4,213,619 A | 7/1980 | Arlt et al. |
| 4,288,104 A | 9/1981 | Nordin |
| 4,350,351 A | 9/1982 | Martin |
| 4,449,720 A | 5/1984 | Wolters et al. |
| 4,487,421 A | 12/1984 | Housas et al. |
| 4,508,355 A | 4/1985 | Ditcher |
| 4,513,996 A | 4/1985 | Jost |
| 4,522,669 A | 6/1985 | Nordin et al. |
| 4,693,482 A | 9/1987 | Daigle et al. |
| 4,809,994 A | 3/1989 | Skinner et al. |
| 4,834,398 A | 5/1989 | Guzowski et al. |
| 5,096,206 A | 3/1992 | Andre et al. |
| 5,529,312 A | 6/1996 | Skinner et al. |
| 5,601,291 A | 2/1997 | Gavin |
| 5,888,023 A | 3/1999 | Grabe et al. |
| 6,089,618 A | 7/2000 | Neumann et al. |
| 6,561,520 B2 * | 5/2003 | Kalsi et al. .................... 277/559 |
| 6,676,136 B2 | 1/2004 | Miller et al. |
| 6,688,652 B2 | 2/2004 | Holmes, IV et al. |
| 6,719,302 B2 | 4/2004 | Andrick |
| 2004/0150170 A1 | 8/2004 | Shaffer et al. |

FOREIGN PATENT DOCUMENTS

GB 2123904 A * 2/1984

* cited by examiner

CAST-IN-PLACE GASKET FOR PIPE JOINTS

This application is a continuation-in-part of U.S. application Ser. No. 11/358,166, filed Feb. 21, 2006, now abandoned the disclosure of which is incorporated reference herein in its entirety.

BACKGROUND

The present invention relates generally to flexible fluid-tight seals for pipe joints. More particularly, the present invention pertains to a cast-in-place gasket for use in various pipe joints. In one embodiment, the gasket can be used for sealing bell and spigot type pipe joints.

Sewer pipe assemblies are generally made of plastic, polyethylene, metal, concrete or other suitable materials. These materials are fabricated in many configurations and sizes to meet specific requirements and the preferences of users. In many such pipe assemblies, but certainly not all, grooves are formed or recesses are provided in the pipe to accommodate a gasket meant to seal between two pipes, such as a bell and a spigot. Usually the spigot, i.e., the male pipe, contains the groove. However, it is also possible that a formed groove in the bell, i.e., the female pipe, can be utilized. Some gaskets are integrally installed at the factory during fabrication of the sewer pipes, while others are simply applied at the job site.

In some known designs, especially if the pipe sections are made out of concrete, the gasket is simply mounted onto the pipe section, for example on a spigot, at the job site before the spigot and bell are connected. However, it would be beneficial to precast the gasket in place on the pipe during the time of manufacture of the pipe. This allows for a much easier installation in the field when the various pipe sections are connected to each other.

It is known to cast in place elastomeric bodies in openings of concrete manholes. Such bodies can be gaskets or washers for accommodating a sewer pipe which is inserted through the opening in the manhole. In such designs, the washers or gaskets are embedded in concrete about their outer margin. The elastomeric bodies lie normal to an axis of the pipe extending through a manhole opening. One problem with such gaskets is to positively and permanently anchor the gasket in the cementicious material which defines the inner surface of the manhole opening.

U.S. Pat. No. 6,089,618 discloses a sealing device for sealing an annular space between two pipes. The pipes can be made of a concrete material. One of the pipes forms a bell, including a socket with a substantially cylindrical inner surface. The other pipe is a spigot which can be introduced into the bell. A sealing device, including a sealing ring consisting of an elastic material, is mounted in the bell. An annular element, consisting of a non-elastic cellular plastic, is connected with the sealing ring. The sealing device is adapted to be positioned on the bell in a mold for molding the bell and for molding the sealing device into a socket of the bell at the cylindrical inner surface thereof. The annular element is positioned axially inside the sealing ring. However, this design necessitates the use of the annular element with the sealing ring.

Also known are embedded bell gaskets which require the use of a forming ring during the manufacture of the bell. An embedded bell gasket which does not require the use of installation forming rings during pipe manufacture would have a considerable economic advantage over systems which utilize a removable secondary element, or a permanently installed secondary element such as is disclosed in the U.S. Pat. No. 6,089,618.

Accordingly, it has been considered desirable to develop and a new and improved gasket and pipe joint design which would overcome the foregoing difficulties and others while providing a cast-in-place design for a gasket used in pipe joints made of a conventional pipe material.

SUMMARY OF THE INVENTION

According to the present invention, a cast-in-place gasket is provided for an associated pipe joint. The gasket is mounted to a first associated pipe and adapted to provide a seal between the first associated pipe and a second associated pipe. The gasket includes a gasket body formed into an annulus from a resilient material. A first sealing head and a second sealing head protrude from the body in an axially rearward and radially inward direction. The first sealing head is axially spaced from the second sealing head. Each of the first sealing head and the second sealing head include a sealing surface. A first mounting foot and a second mounting foot protrude from the body in a radially outward direction. The first mounting foot is axially spaced from the second mounting foot. An open annular cavity is defined in the body between the first sealing head and the second sealing head. A first lip protrudes from the body proximal to a base of the first sealing head and extends in an axially forward and radially inward direction. A second lip protrudes from the body proximal to the sealing surface of the second sealing head and extends in an axially rearward and radially inward direction. The first lip and the second lip cooperate to inhibit the flow of an associated casting material from contacting the sealing surfaces of the gasket during casting of the associated first pipe.

In accordance with another aspect of the present invention, a gasket for sealing between a pair of associated pipes is provided. The gasket includes an annular gasket body formed of a resilient material. The gasket body includes a body section, a first foot, and a second foot. The second foot is spaced from the first foot. A first head portion and a second head portion are also provided. A U-shaped opening is defined in the body section for spacing the second head portion away from the first head portion.

In accordance with yet another aspect of the present invention, a gasket is provided for positioning within an annular groove located in one of an outer pipe and an inner pipe. The gasket provides a seal between the outer pipe and the inner pipe. The gasket includes an annular gasket body formed of a resilient material. The gasket body includes a body section, at least one foot protruding away from the body section in a first direction, and at least two heads protruding away from the body section in a second, and opposite, direction. The at least two heads are spaced from each other, each of the at least two heads including a sealing face. The at least one foot is meant to be imbedded in a material of the associated inner or outer pipe. A lip is provided extending away from one of the at least two heads for retarding a flow of concrete mix from getting under the gasket and displacing it when the associated inner or outer pipe is being cast.

According to still another aspect of the present invention, a method of integrally casting a pipe section together with a gasket is provided. The method includes providing a mold for forming the pipe section to be cast, the mold including a casting surface for receiving a material to be cast. A gasket is provided including a body, a sealing head, at least one foot, a first lip extending from the body in a first direction, and a second lip extending from the body in a second, generally opposite, direction. The gasket is placed on the mold. The first lip and the second lip are placed in sealing contact with the casting surface of the mold. The material to be cast is poured into the mold. The material to be cast envelopes a rear surface of the gasket including the at least one foot. The material to be cast is prevented from flowing in between the gasket and an area of the casting surface defined between the first lip and the second lip. The poured cast material is allowed to at least partially solidify. The mold is withdrawn from the integrally casted pipe section and gasket.

Further benefits and advantages of the present invention will become apparent to those skilled in the art upon a reading and understanding of the following detailed specification.

BRIEF DESCRIPTION OF THE DRAWINGS

The invention may take physical form in certain structures and parts, several preferred embodiments of which will be described in detail in this specification and illustrated in the accompanying drawings, wherein.

DETAILED DESCRIPTION

Figure 1:
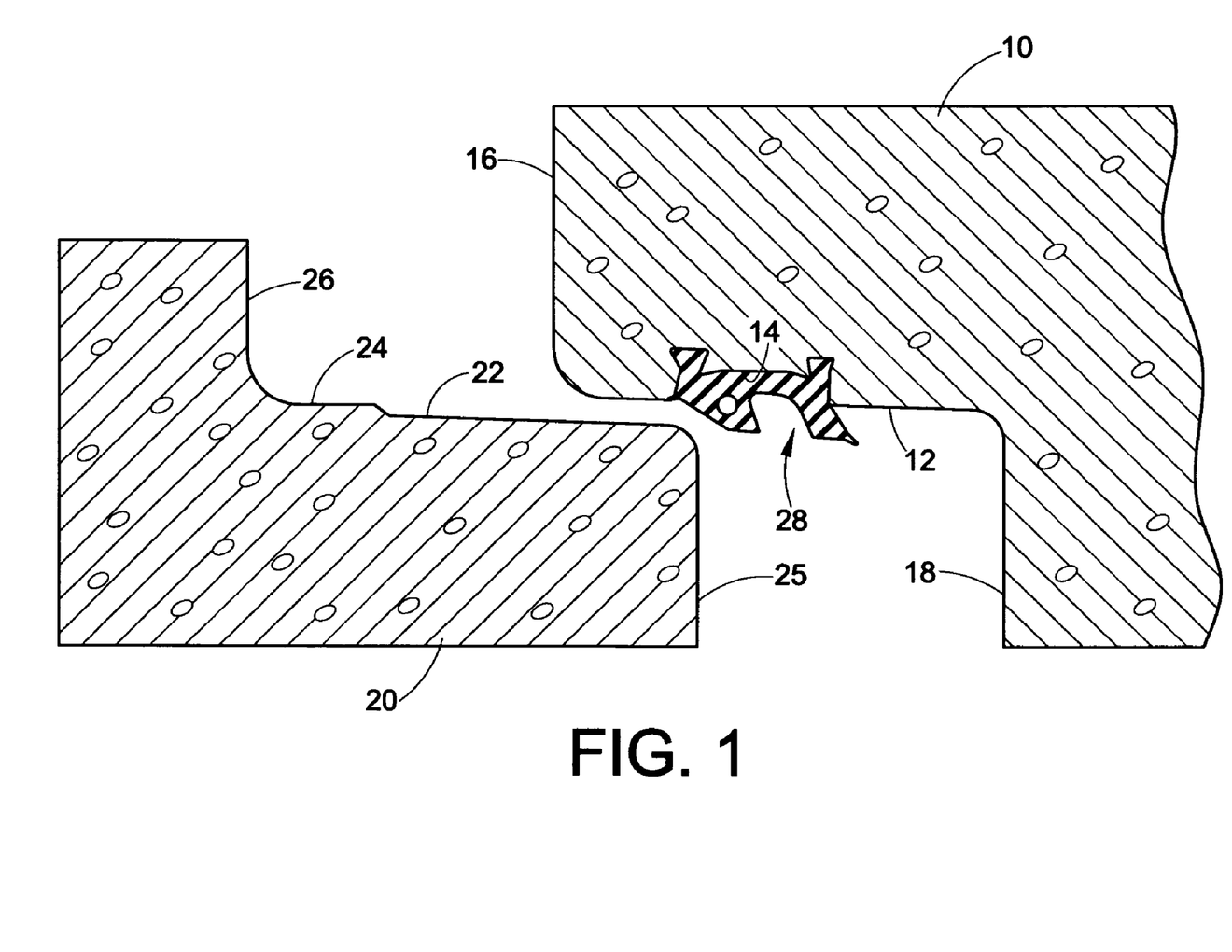
FIG. 1 is a cross sectional view of pipes and a gasket employed in a pipe joint according to a first embodiment of the present invention.

Referring now to the drawings, wherein the showings are for purposes of illustrating several preferred embodiments of the invention only and not for purposes of limiting same, FIG. 1 shows a pipe joint including a first female pipe, such as a bell 10, a second male pipe, such as a spigot 20 and a gasket 28 which is meant to seal between the bell and the spigot. The gasket disclosed herein is particularly adapted for use in the field of sewer pipe assemblies. While the embodiment disclosed pertains to a gasket used in a pipe joint between a bell and a spigot, it should be appreciated that the gasket could be employed in a variety of other types of pipe joints as well. For example, the gasket could be used in a pipe joint in straight wall pipe.

It is well known that the bell 10, the spigot 20 and the gasket 28 are all annular. The bell and spigot can be formed from conventional concrete materials, if desired. The gasket 28 can be made from a suitable elastomeric material, such as styrene-butadiene rubber, or any other known elastomer.

The bell 10 includes a radially inwardly directed surface 12 including an annular cavity, groove or socket 14 which is meant to accommodate at least a portion of the gasket 28. The bell also includes an end wall 16 and, spaced therefrom, a flange 18. The spigot 20 includes a radially outwardly directed surface comprising a first section 22 and a second section 24. It is apparent that the first section 22 has a somewhat smaller diameter than does the second section 24. In addition, the spigot 20 comprises an end wall 25 and a flange 26. When the bell and spigot are brought together, the bell end wall 16 is brought adjacent the spigot flange 26. Similarly, the spigot end wall 25 is brought adjacent the flange 18 of the bell 10. As the bell and spigot are slid towards each other, the gasket is moved along the spigot first section 22 and approaches the spigot second section 24 such that at least a portion of the gasket contacts the second section. At this time, the gasket 28 provides a seal between the bell and the spigot in order to prevent a leakage of fluid into or out of the pipes at the joint between them.

Figure 2:
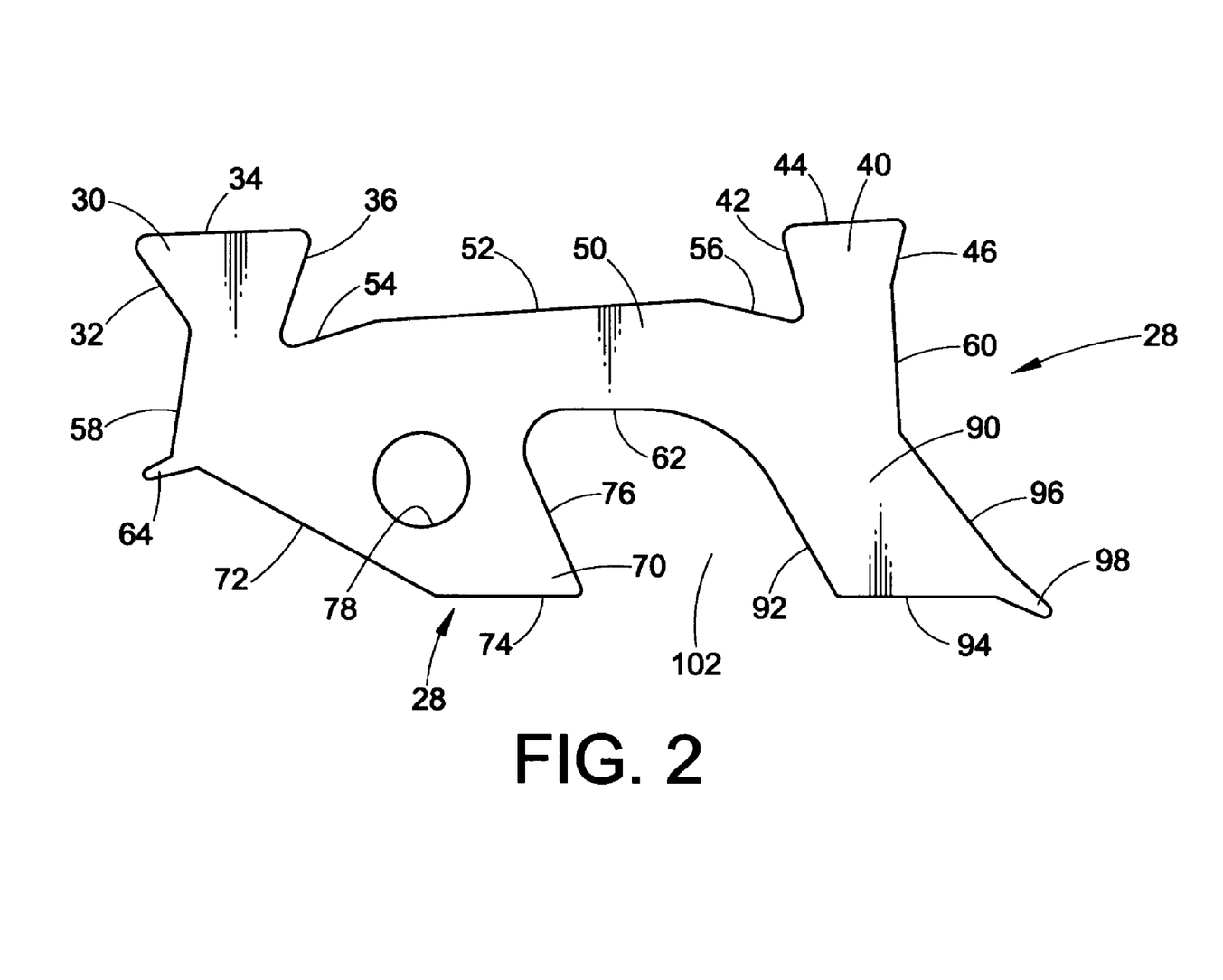
FIG. 2 is an enlarged cross-sectional view of the gasket of the pipe joint of FIG. 1.

With reference now to FIG. 2, the gasket 28 comprises a first foot portion 30 including a first wall 32, a second wall 34 and a third wall 36. It is apparent that the foot portion includes a somewhat triangular or trapezoidal shape such that the first and third wall sections 32 and 36 are disposed, respectively, at acute and obtuse angles in relation to an axis extending perpendicularly through the plane of the second wall 34. Spaced from the first foot portion 30 is a second foot portion 40. The second foot portion similarly has a first wall 42, second wall 44 and a third wall 46. Again, a somewhat triangular shaped foot portion is provided, such that the first and third walls 42 and 46 are disposed at, respectively, an acute and an obtuse angle in relation to an axis extending perpendicularly through a plane of the second wall portion 44.

The first and second feet 30 and 40 protrude radially outwardly from a body section 50 of the gasket. The body section includes an outer wall 52 having first and second ends 54 and 56 that are angled in relation to a plane of the remainder of the outer wall 52. The body further includes a first side wall 58 and a second side wall 60. Finally, the body includes an inner wall 62 which is oriented approximately parallel to the outer wall 52. Protruding from the body first side wall 58 is a first lip 64.

Extending radially inwardly from the body 50, in a direction opposite the direction of a first and second feet 30 and 40, is a first head portion 70. The first head portion includes a first wall 72, a second wall 74 and a third wall 76. Also provided is a bore 78. The bore enables the first head portion to be more readily compressed, as necessary when the bell and spigot are brought into a connected condition. It is apparent that the first head portion first wall 72 is disposed at an acute angle in relation to an axis running perpendicular to a plane of the second wall 74. It is noted that the third wall 76 is also disposed at an acute angle in relation to that axis. Thus, a somewhat wedge-shaped first head portion is provided.

The gasket further comprises a second head portion 90, spaced from the first head portion 70 and extending radially inwardly from the body 50. The second head portion includes a first wall 92, a second wall 94 and a third wall 96. Also provided is a second lip 98 which extends away from the second head portion 90, at the intersection of the second and third walls 94 and 96. The first and third walls 92 and 96 are each disposed at an acute angle in relation to an axis running perpendicular to a plane of the second wall 94. The second head portion 90 can be somewhat trapezoidal in shape.

With this gasket design, an opening 102 is defined between the first and second head portions 70 and 90. The opening is meant to accommodate at least a section of the first head portion 70 as it is crushed against the remainder of the gasket 28 when the spigot is advanced into the bell.

As is evident from FIG. 1, the cavity 14 in the bell 10 can accommodate not only the first and second feet 30 and 40 of the gasket, but also at least a portion of the body 50. In fact, in the design shown, one surface of the first lip 64 is located at the internal surface 12 of the bell 10. The concrete material of the bell 10 extends to the intersection of the second side wall 60 of the body 50 and the third wall 96 of the second head portion 90 as is evident from FIG. 1. Thus, the body is held in the cavity 14.

With this design, two spaced seal areas are provided on the gasket 28. The two spaced seal areas are defined by the two heads 70 and 90. Such a design allows for sealing capabilities in both a non-pressure environment and a low pressure environment, while the gasket is in compression. It also allows for use in a pressurized condition when the pressure on the gasket is hydraulically induced.

The gasket 28, can be made from an elastomeric material which can be extruded or similarly manufactured. In order to convert the extrusion into a ring gasket, it is first necessary to cut a piece of it to the desired length. The cut section of the extrusion is then curled into the form of a torus or ring such that its ends are brought together and secured to each other, such as by vulcanization. In order to avoid distortion of the extrusion during vulcanization, a dowel pin or the like (not illustrated) can be placed in the bore 78. The dowel pin can be made of a suitable readily frangible material such as plaster of paris. After vulcanization has been completed, the dowel pin can be reduced by hammering to fine powder so that it does not block the bore 78 in the first head portion 70 of the gasket. After preparation of the gasket, it is suitably held in a mold or form into which the concrete is poured. Normally, such work would be conducted in the shop rather than in the field. With the gasket in place and the concrete of the bell cured, the bell 10 can then be transported to the field for assembly with a suitable spigot.

While in the embodiment illustrated in FIG. 1, the gasket 28 is shown as being embedded in the bell 10, it should be appreciated that a gasket could also be cast in place in the spigot.

The present invention has been developed to facilitate effective sealing in a piping system where design considerations of the pipe joint forming equipment allow for the placement of the gasket on the machined pallet which forms the bell surfaces. This provides a permanently installed seal in the pipe bell, making field installation more convenient and cost effective—which saves considerable time and labor. With the present invention, design limitations which are present in the current state of the art have been taken into consideration. The primary limitation is the required placement of either a flexible or a rigid spacer or filler that positions the gasket on the machined pallet. These can be made of flexible elastomeric material, rigid plastics or foamed plastics, such a styrofoam. However, the various production methods employed by the state of the art also necessarily involve the collection and disposal of these forming rings that have been cycled through the manufacturing of the pipe product. Obviously, this costs time, effort and money.

In addition, the gasket 28 incorporates a novel approach to increasing the surface contact pressure which the gasket exerts against the machined pallet surface. Specifically, at least one foot and at least one head extend outwardly from each end of the gasket body. The projections, or formed sealing elements, are of such design and placement as to create a surface effect which prevents the concrete mixture from flowing underneath the gasket 28 and lifting or displacing the gasket during the pipe manufacturing process. The projections are shaped and positioned such that they will cause the gasket to be held properly in the location that will provide the pipe with a successful permanent sealing system.

Moreover, the dual sealing elements or heads 70 and 90 illustrated in FIG. 2 allow for a pipe joint that can effectively seal against the spigot mating surface in situations were a deflection of the joint occurs. The bore 78 and the opening 102 are beneficial to allow for compression and movement of the gasket heads 70 and 90 under various conditions of installation and operation. The bore 78 is advantageous where insertion force or point loading during coupling is a concern. Such bores or openings allow the gasket to yield and distribute the load in a broader pattern of the gasket face than solid designs would.

Figure 3:
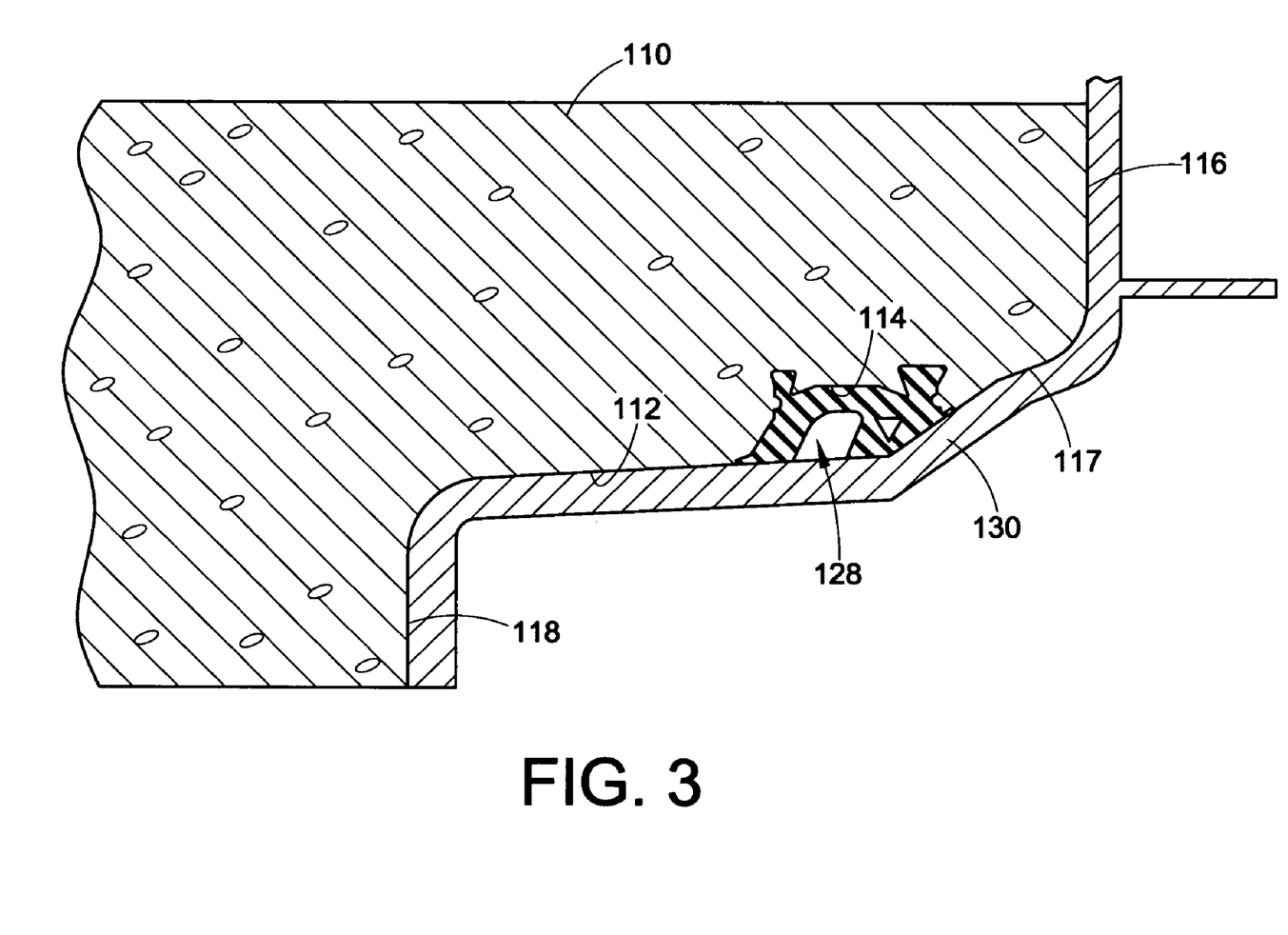
FIG. 3 is a side elevational view of a second type of bell employing a gasket according to a second embodiment of the present invention, in the process of being manufactured.

With reference now to FIG. 3, a method of manufacturing the cast-in-place gasket according to a second embodiment of the present invention is there illustrated. In this embodiment, a bell 110 includes an internal surface 112 which includes a cavity or socket 114. The bell also includes an end wall 116, as well as a connecting wall 117 which leads from the end wall to the internal surface 112. As is evident from FIGS. 3 and 4, the cavity or socket 114 is located along the internal surface between it and the connecting wall 117. The bell also includes a flange 118.

Figure 4:
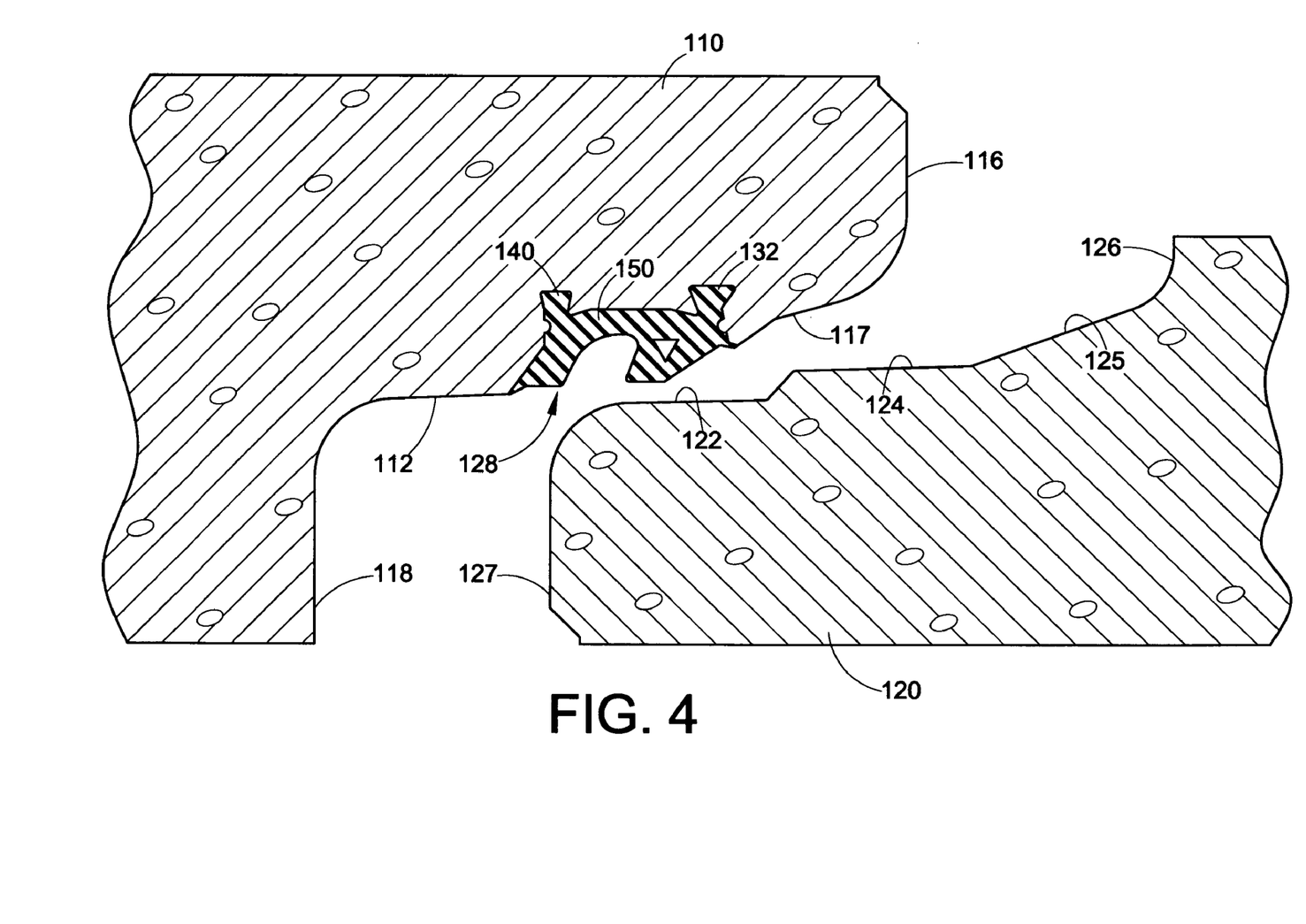
FIG. 4 is a cross sectional view of the bell and gasket of FIG. 3 being employed in a pipe joint.

With reference to FIG. 4, a suitable mating spigot 120 includes an internal wall with a first section 122, a second section 124 and a third section 125 which leads to a flange 126. It is apparent that the first, second and third sections have differing diameters. The spigot also includes an end wall 127. A gasket 128 is positioned in the cavity or socket 114. During the manufacture of the cast-in-place gasket in the bell, a bell pallet 130 is employed, as shown in FIG. 3. Once the concrete has hardened, the pallet is removed. After the concrete has cured, the bell can be taken to a work site and installed.

Figure 8:
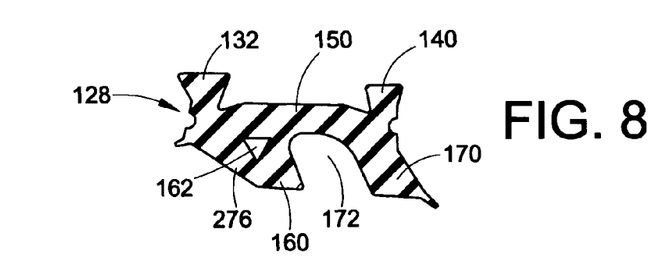
FIG. 8 is a reverse cross sectional view of the gasket of FIGS. 3 and 4.

With reference now also to FIG. 8, the gasket 128 includes a first foot 132, a second foot 140, a body 150, as well as a first head 160, including a bore 162, and a second head 170 spaced therefrom. It is noted that the bore 162 is triangular in shape unlike the circular bore 78 illustrated in the gasket of FIG. 2. A somewhat U-shaped opening 172 is disposed between the first and second heads 160 and 170. The shape of the opening can be similar to the shape of the opening 102 illustrated in the gasket 28 of FIG. 2.

Figure 5:
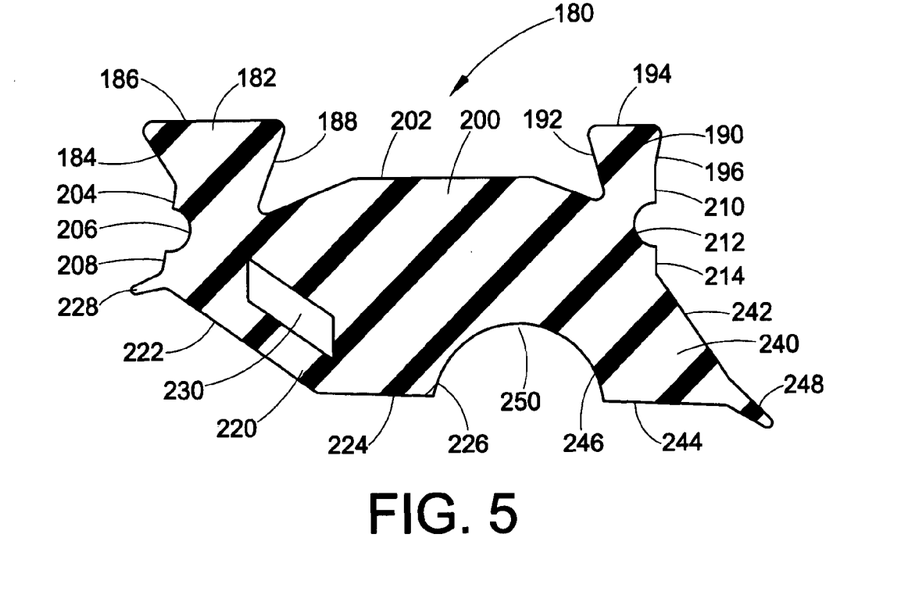
FIG. 5 is cross sectional view of a gasket according to a third embodiment of the present invention.

With reference now also to FIG. 5, a gasket 180 according to a third embodiment of the present invention is there illustrated. This gasket includes a first foot 182 having a first wall 184, a second wall 186 and a third wall 188. A somewhat triangular foot is thus disclosed, similar to the foot 30 illustrated in FIG. 2. Spaced from the first foot 182 is a second foot 190. The second foot can also include a first wall 192, a second wall 194 and a third wall 196. It is apparent that the second foot, which is also somewhat triangular in shape, is significantly smaller in size than is the first foot 182.

The gasket 180 also includes a body 200 including an end wall 202 which is similar in design to the end wall 52 illustrated in FIG. 2. The body also includes a side wall having a first section 204, a recess 206 and a second section 208. The body also includes a second side wall having a first section 210, a recess 212 and a second section 214. The recesses 206 and 212 serve to lock the gasket in the cavity defined in the bell.

Moreover, the gasket 180 includes a first head 220 having a first wall 222 and a second wall 224. Both of these are planar. The first head also includes a curved third wall 226. Defined at the intersection of the first head 220 and the body first side wall second section 208 is a first lip 228. Located in the first head 220 is a bore 230. In this embodiment, the bore can be rectangular in shape. Finally, the gasket 180 includes a second head 240. The second head comprises a first wall 242 and a second wall 244, both of which can be approximately planar, as well as a curved third wall 246. A lip 248 is defined at the intersection of the first and second walls 240 and 244. An opening 250 is defined between the first and second heads 220 and 240. In this embodiment, the opening is semi-circular in shape. The lips 228 and 248 serve to prevent the concrete from flowing over the sealing surfaces or heads of the gasket during the casting of the bell.

Figure 6:
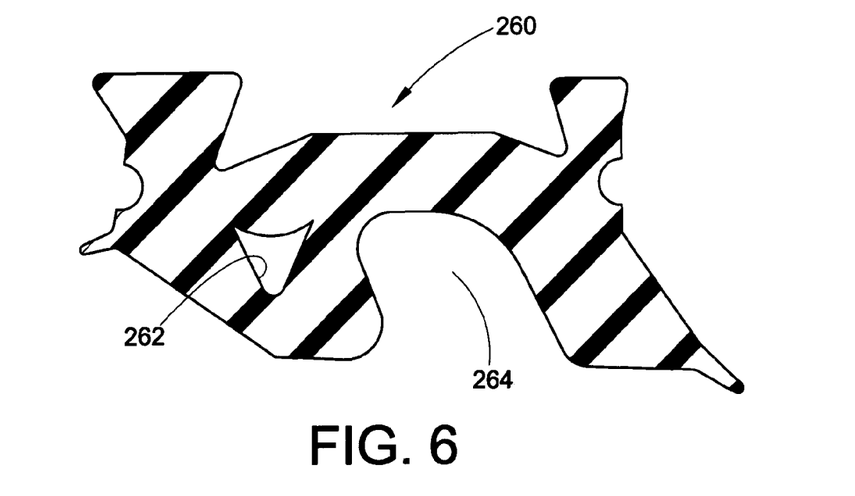
FIG. 6 is a cross sectional view of a gasket according to a fourth embodiment of the present invention.

With reference now to FIG. 6, a gasket 260 according to a fourth embodiment of the present invention is there illustrated. This embodiment of the gasket is similar to the third embodiment illustrated in FIG. 5 with two exceptions. First, a bore 262 in a first head is generally triangular in shape wherein at least one wall of triangular bore 262 is curved. Secondly, an opening 264 between the two heads of the gasket is generally U-shaped in cross section.

Figure 7:
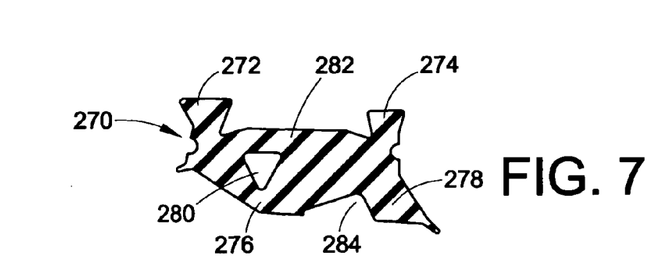
FIG. 7 is a cross sectional view of a gasket according to a fifth embodiment of the present invention.

With reference now to FIG. 7, a gasket 270 according to a fifth embodiment of the present invention is there illustrated. In this embodiment, the gasket includes a first foot 272, a second foot 274, a first head 276 and a second head 278. As with the embodiment of FIG. 5, the first foot is larger than the second foot. A somewhat triangular bore 280 is defined in the gasket. The bore is relatively large compared to the size of the first head 276 and also extends into a body 282 of the gasket. Also, in this embodiment, an opening 284 between the first head 276 and the second head 278 is somewhat wedge shaped in cross section.

Figure 9:
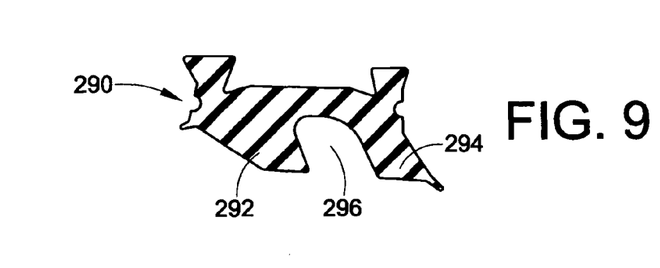
FIG. 9 is a cross sectional view of a gasket according to a sixth embodiment of the present invention.

With reference now to FIG. 9, a gasket 290 according to a sixth embodiment of the present invention is there illustrated. In this design, a gasket comprises a first head 292 and a second head 294 separated by an opening 296. The gasket first head 292 does not include a bore. Thus, the first head is stiffer than, e.g., the gasket embodiment of FIG. 8.

Figure 10:
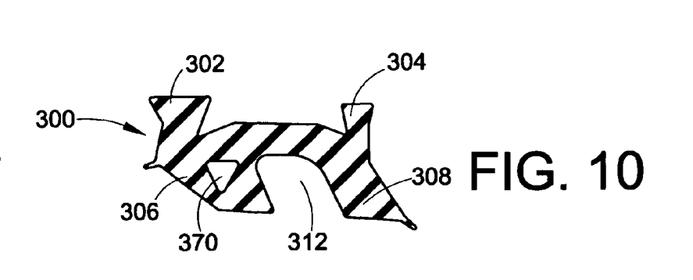
FIG. 10 is a cross sectional view of a gasket according to a seventh embodiment of the present invention.

A seventh embodiment of the present invention is illustrated in FIG. 10. In this design, a gasket 300 includes a first foot 302, a second foot 304, a first head 306 and a second head 308. It is apparent that the first foot 302 is significantly larger than the second foot 304. The first head includes a triangular shaped bore 310. An opening 312, which can be somewhat U-shaped, again separates the first head 306 from the second head 308.

Figure 11:
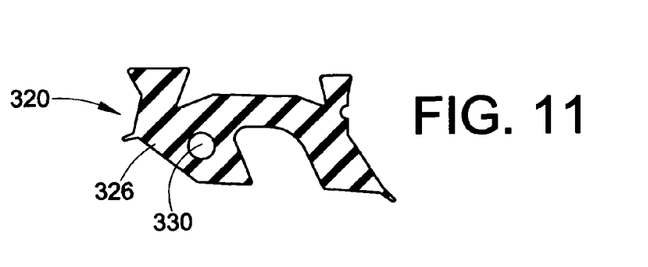
FIG. 11 is a cross sectional view of a gasket according to an eighth embodiment of the present invention.

With reference now to FIG. 11, an eighth embodiment of a gasket 320 is there illustrated. In this embodiment, a first head 326 of the gasket includes a circular bore 330.

Figure 12:
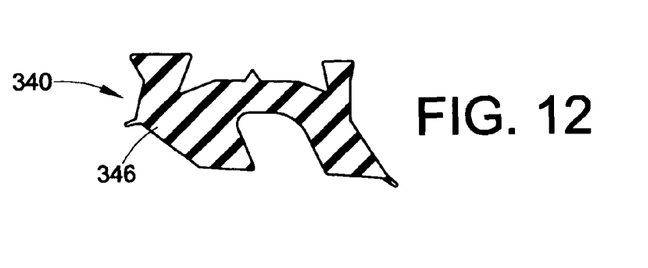
FIG. 12 is a cross sectional view of a gasket according to a ninth embodiment of the present invention.

FIG. 12 illustrates a ninth embodiment of a gasket 340. In this embodiment, a first head 346 of the gasket does not include a bore, unlike the embodiment of FIG. 11, thus forming a stiffer, less yielding, first head. In addition, the gasket 340 includes a middle support protrusion, located between a first foot and a second foot.

Figures 13, 14:
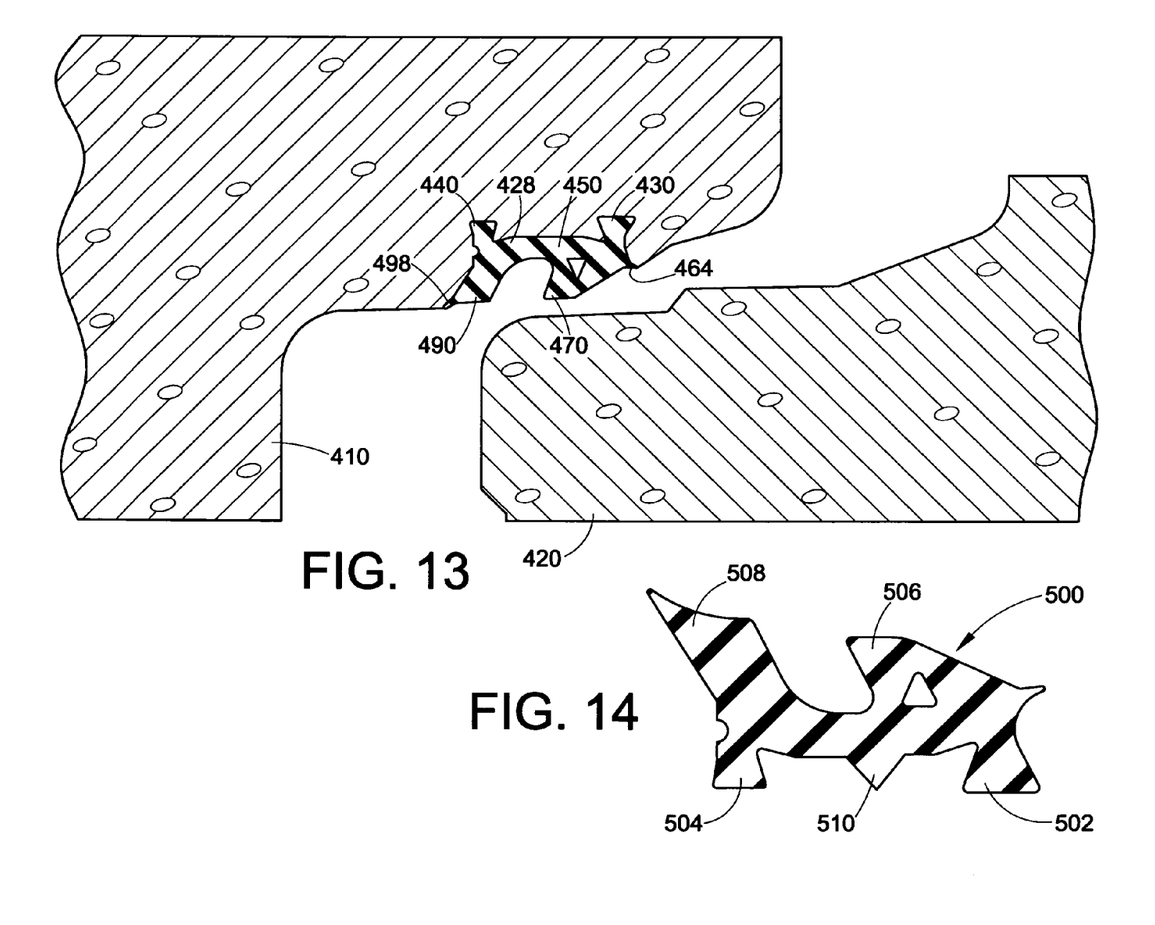
FIG. 13 is a cross sectional view of pipes and a gasket employed in a pipe joint according to a tenth embodiment of the present invention.
FIG. 14 is a cross sectional view of a gasket according to an eleventh embodiment of the present invention.

FIG. 13 illustrates another embodiment in which a bell 410, a spigot 420 and a gasket 428 are provided. The gasket 428 provides a seal between the bell and the spigot, in order to prevent a leakage of fluid into or out of the pipes at the joint between them. The gasket comprises a pair of feet 430 and 440, which are each somewhat triangular in shape. Extending radially away from a body 450 of the gasket are located are a first head portion 470 and a second head portion 490. Thus, the feet 430 and 440 extend away from the body 450 in a first direction and the two head portions 470 and 490 extend away in a second, opposite, direction. Also provided are a pair of fins 464 and 498 extending, respectively, from the first and second heads 470 and 490. These fins have been found very advantageous in preventing the concrete mix of the bell from getting under the gasket and displacing it, during the pipe manufacturing process. These two fins also prevent the sealing surfaces of the gaskets from becoming contaminated by the slurry that is present during the concrete pipe manufacturing cycle.

With reference to FIG. 14, a gasket 500, according to yet another embodiment, includes a first foot 502, a second foot 504, a first head 506 and a second head 508. In this embodiment, there is also provided a middle support protrusion 510, located between the first and second feet 502 and 504. The middle support protrusion is advantageous in order to increase the contact pressure of the front or first head 506 against the spigot. The middle support protrusion 510 may serve to prevent a collapse of the gasket 500 when contacted by the spigot during installation of the spigot in the bell.

Figure 15:
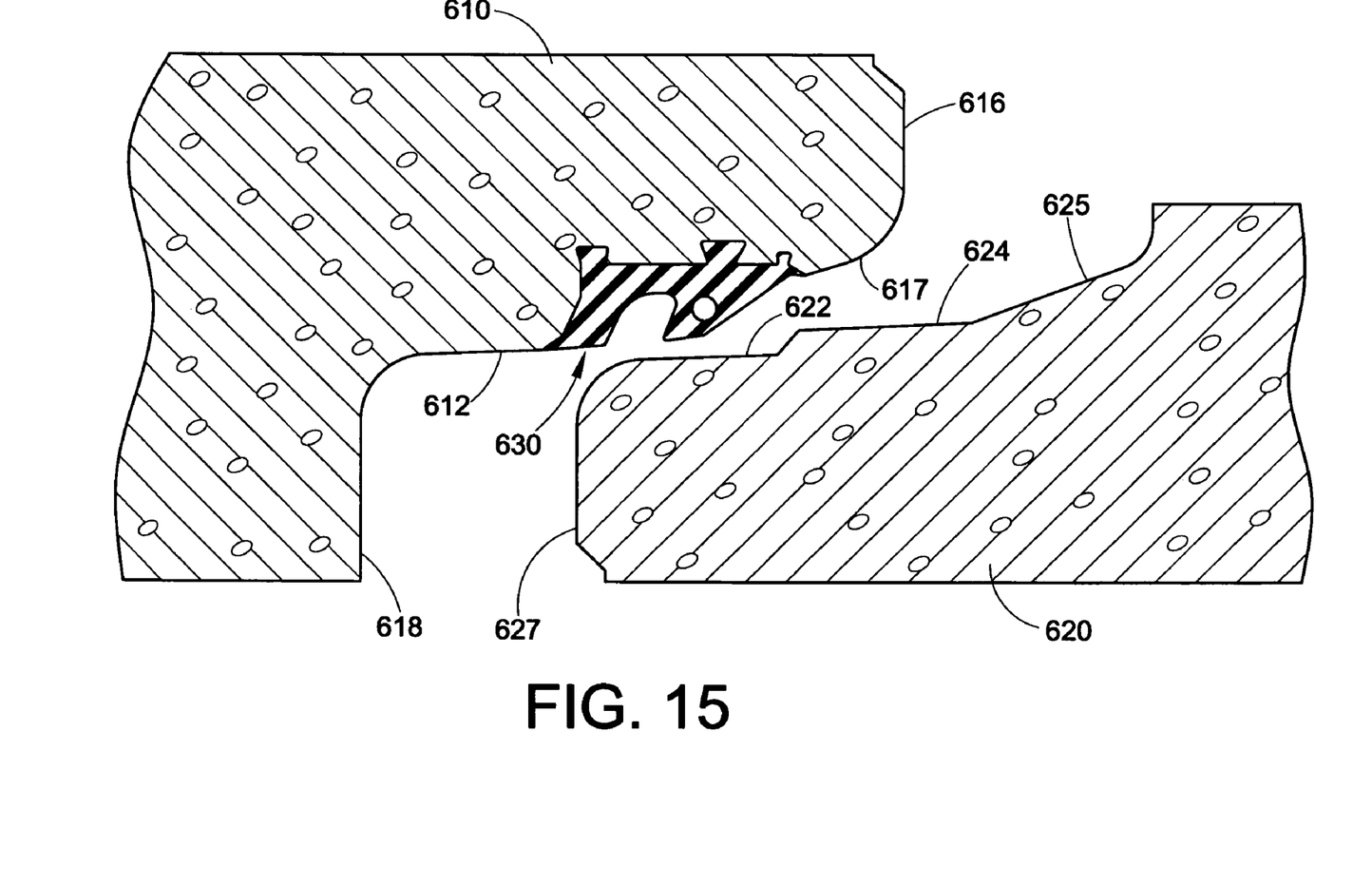
FIG. 15 is a cross sectional view of pipes and a gasket employed in a pipe joint according to a twelfth embodiment of the present invention; and, FIG. 16 is an enlarged cross-sectional view of the gasket of the pipe joint of FIG. 15.
Figure 16:
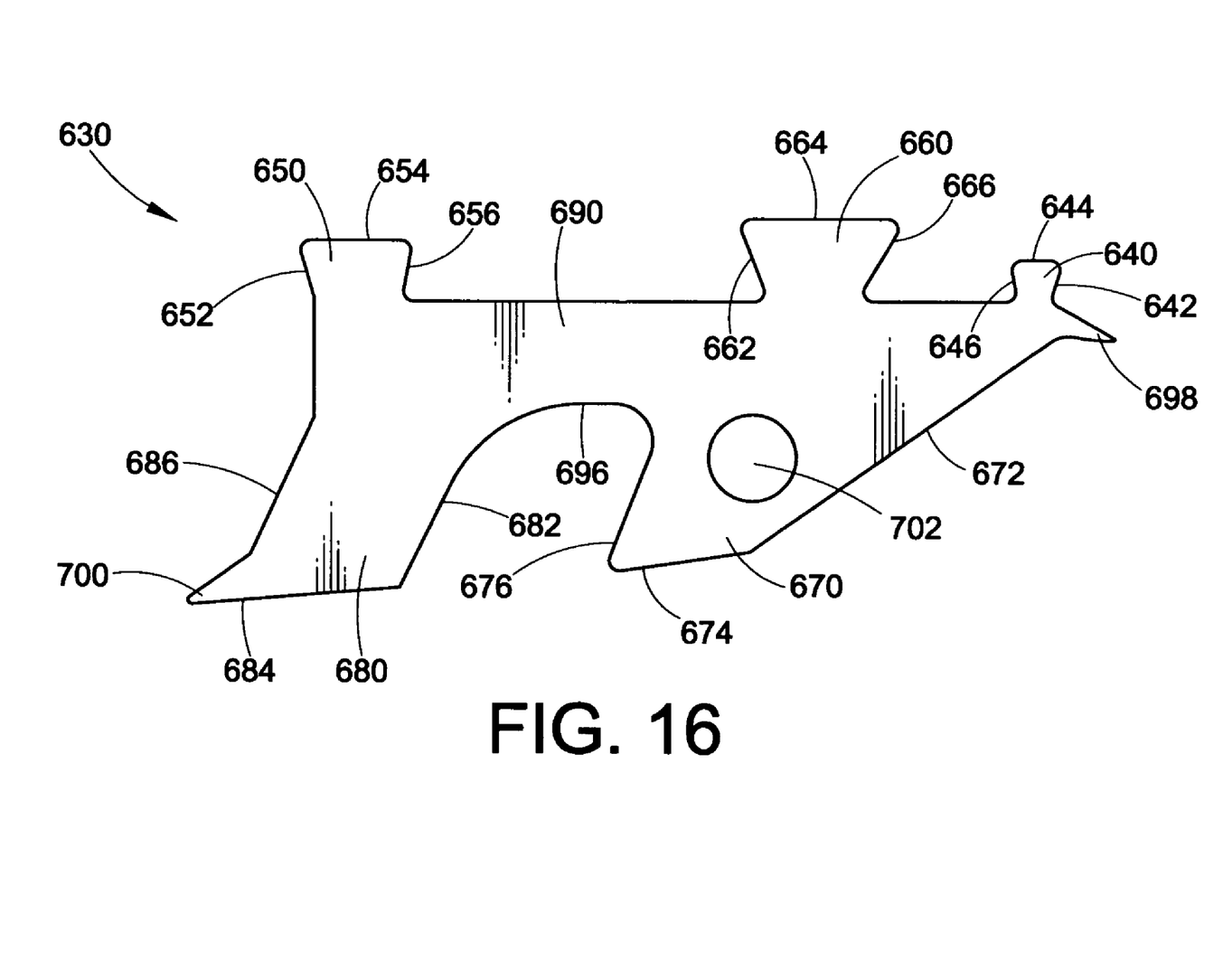

With reference to FIGS. 15 and 16, another embodiment of a pipe joint and a gasket according to the present invention is illustrated. With particular reference to FIG. 15, a bell 610 includes an inner wall surface 612, an end wall surface 616, a curved portion 617 and a flange 618. Complementing the bell 610, a spigot 620 includes an inner wall surface 622, a first seal mating surface 624, a second seal mating surface 625, and an end wall 627. A gasket 630 is cast-in-place in the bell 610, as shown, such that the gasket 630 provides a seal between the bell 610 and the spigot 620.

With reference to FIG. 16, the gasket 630 includes many similar features to those described with respect to the previously discussed embodiments. In particular, the gasket 630 includes a generally triangular first foot 640 having a first wall 642, a second wall 644, and a third wall 646. The gasket 630 also includes a second foot 650 similarly defined by a first wall 652, a second wall 654, and a third wall 656. Unlike the previous embodiments, the gasket 630 includes an oversized third foot 660 disposed between the first and second feet 640, 650. The third foot can be similar in shape to the first and or second feet and include a first wall 662, a second wall 664, and a third wall 666, forming a somewhat triangular or trapezoidal shape in side view, as shown in FIG. 16. Once the pipe joint containing the gasket 630, e.g. the bell, has been cast, the third foot 660 (together with the first foot 640) will securely retain the forward portion of the gasket in the bell. This is particularly advantageous during insertion of the spigot into the bell where a slight alignment error could cause a portion of the spigot end wall 627 (FIG. 15) to impact the forward portion of the gasket 630, potentially dislodging or pulling the gasket 630 out of the bell or otherwise spoiling the seal between the bell and spigot.

By adding the oversized third foot 660 the risk of such an occurrence is dramatically reduced due to the increased pressure required to extract the third foot 660 from the casted material of the joint. Because, the third foot 660 is larger than the first or second foot 640, 650 and displaces a greater amount of casted material than the first or second foot 640, 650 it necessarily includes a greater volume of gasket material that also results in a larger contact area with the casted material of the pipe joint. In addition, this added volume of gasket material requires a greater amount of tensile force and/or compression to be applied to the gasket 630 in order to cause it to shear, pull out, collapse, or otherwise fail.

With continued reference to FIG. 16, the gasket 630 further includes a first sealing head 670 having a first sealing wall 672, a second sealing wall 674, and a third wall 676. Similarly, the gasket 630 includes a second sealing head 680 defined by a first wall 682, a second or sealing wall 684, and a third wall 686. Between the first and second sealing heads 670, 680 is a generally U-shaped cavity in a body 690 of the gasket 630. The cavity is defined by the third wall 676 of the first sealing head 670, the first wall 682 of the second sealing head 680, and a body wall 696. As described with respect to the previous embodiments, the U-shaped cavity provides a relief area such that when the first sealing head is biased rearwardly toward the second sealing head, during insertion of the spigot, the first sealing head can deflect so as to facilitate the engagement of the spigot into the bell. Furthermore, an annular bore 702 may be provided in the generally vicinity of the first sealing head 670 so as to provide a localized region of reduced stiffness in or around the first sealing head 670. Such bore, or relieved area in the first sealing head, allows the first sealing head to be more compliant and more likely provide a satisfactory seal against the spigot.

Finally, it should be noted that the gasket 630 includes a first lip 698 that protrudes forward of the first sealing wall 672 of the first sealing head 670. Similarly, a second lip 700 protrudes rearward of the sealing and third walls, 684, 686 of the second sealing head 680. By comparison to the previous embodiments, the first and second lips 698, 700 are larger and angled more aggressively to prevent the material to be cast, e.g. concrete, from seeping past the lips 698, 702 during the casting process. As described previously, any such seepage is disadvantageous. If the material to be cast comes into contact with or contaminates the sealing surfaces of the gasket 630 the connection between the spigot and bell will likely leak or the gasket will otherwise fail.

While the gasket has been discussed as being made of a resilient material, which in one embodiment can be styrene-butadiene rubber, the gasket can be made of any other suitable known elastomeric material. In addition, the gasket can also be made of a dual durometer material. In other words, the top, sealing portions of the gasket can be made of a softer material than the feet which are imbedded in the concrete. Thus, with reference, e.g., to FIG. 13, the feet 430 and 440 of the gasket could be made of a harder, higher durometer, material while the heads 470 and 490 are made of a softer, lower durometer, material.

The invention has been described with reference to several preferred embodiments. Obviously, modifications and alterations will occur to others upon the reading and understanding of this specification. It is intended to include all such modifications and alterations insofar as they come within the scope of the appended claims or the equivalents thereof.

The invention claimed is:

1. A cast-in-place gasket for an associated pipe joint, the gasket being mounted to a first associated pipe and adapted to provide a seal between the first associated pipe and a second associated pipe, said gasket comprising:
   a gasket body formed into an annulus from a resilient material;
   a first sealing head and a second sealing head protruding from said body in an axially rearward and radially inward direction, said first sealing head being axially spaced from said second sealing head, each of said first sealing head and said second sealing head including a sealing surface;
   a first mounting foot and a second mounting foot protruding from said body in a radially outward direction, at least one of the first and second mounting feet having a radially outer axial dimension that is larger than a radially inner axial dimension for securing the gasket within a casting material of the first associated pipe, said first mounting foot being axially spaced from said second mounting foot;
   an open annular cavity defined in said body between said first sealing head and said second sealing head;
   a first lip protruding from said body proximal to a base end of said first sealing head and extending in an axially forward and radially inward direction;
   a second lip protruding from said body proximal to an end of said sealing surface of said second sealing head and extending in an axially rearward and radially inward direction; and
   wherein said first lip and said second lip cooperate to inhibit the flow of an associated casting material from contacting said sealing surfaces of said gasket during casting of the associated first pipe.

2. The gasket of claim 1, wherein at least one of the first or second mounting foot includes a generally trapezoidal or triangular cross section.

3. The gasket of claim 1, wherein said gasket body comprises a dual durometer material.

4. The gasket of claim 3, wherein at least one of the first or second mounting foot comprises a higher durometer material than at least one of said first or second sealing head.

5. The gasket of claim 1, wherein at least one of the first or second sealing head includes a generally trapezoidal, rectangular, or parallelogram-like cross section.

6. The gasket of claim 1, further comprising a toroidal bore extending through said body of said gasket.

7. The gasket of claim 6, wherein the bore is disposed within one of the first or second sealing heads, the bore including one of a generally circular, triangular, rectangular, trapezoidal or U-shaped cross section.

8. A gasket for sealing between a pair of associated pipes, said gasket comprising an annular gasket body formed of a resilient material, said gasket body comprising:
   a body section;
   a first foot;
   a second foot, wherein said second foot is spaced from said first foot;
   wherein at least one of said first foot and second foot has an axial extent that is greatest at a position spaced from the body section for securing the gasket in a material of one of the pair of associated pipes;
   a first head portion including a first lip extending away from an end of said first head portion; and
   a second head portion including a second lip extending away from an end of said second head portion; and
   a U-shaped opening defined in said body section for spacing said second head portion away from said first head portion.

9. The gasket of claim 8, wherein said U-shaped opening is of a size larger than a size of said first head portion to accommodate a movement of at least some of said first head portion into said opening as the pair of associated pipes are brought adjacent each other.

10. The gasket of claim 8, wherein said first lip extends away from a first side wall of said body section and said second lip extends away from a second side wall of said body section.

11. The gasket of claim 8, further comprising a toroidal opening extending through said first head portion.

12. The gasket of claim 8, wherein said first and second feet are spaced from each other.

13. The gasket of claim 12, further comprising a protrusion located between said first and second feet.

14. The gasket of claim 8, wherein said gasket body comprises a dual durometer material such that at least one of said first and second feet comprises a higher durometer material than a material of at least one of said first and second head portions.

15. A gasket for positioning within an annular groove located in one of an outer pipe and an inner pipe, the gasket providing a seal between the outer pipe and the inner pipe, the gasket comprising an annular gasket body formed of a resilient material, said gasket body comprising:

a body section;

at least one foot protruding away from said body section in a first direction;

at least two heads protruding away from said body section in a second, and opposite, direction, said at least two heads being spaced from each other, each of said at least two heads comprising a sealing face;

wherein said at least one foot includes a proximal end secured to said body section and a distal end wherein said distal end has an axial dimension that is larger than an axial dimension of said proximal end for securing the gasket in a material of the associated inner or outer pipe; and, a lip extending away from an end of one of said at least two heads for retarding a flow of concrete mix from getting under the gasket and displacing it when the associated inner or outer pipe is being cast.

16. The gasket of claim 15, wherein said gasket body comprises a dual durometer material such that said at least one foot comprises a higher durometer material than a material of said at least two heads.

17. The gasket of claim 15, further comprising a toroidal opening extending through said at least two heads.

18. The gasket of claim 15, wherein said at least one foot and said at least two heads are located on opposed sides of said body section.

19. The gasket of claim 15, wherein said at least one foot is approximately triangular in cross section.

20. The gasket of claim 15, wherein said body section includes at least one semi-circular recess adjacent the at least one foot for locking the gasket in place with the respective outer or inner pipe.

* * * * *